(12) United States Patent
Lin

(10) Patent No.: US 12,206,614 B2
(45) Date of Patent: Jan. 21, 2025

(54) METHOD FOR SRS BUNDLING IN NRU

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 406 days.

(21) Appl. No.: 17/844,912

(22) Filed: Jun. 21, 2022

(65) Prior Publication Data

US 2022/0337371 A1 Oct. 20, 2022

Related U.S. Application Data

(63) Continuation of application No. PCT/IB2019/001457, filed on Dec. 23, 2019.

(51) Int. Cl.
*H04L 5/00* (2006.01)
*H04W 72/23* (2023.01)

(52) U.S. Cl.
CPC .......... *H04L 5/0051* (2013.01); *H04W 72/23* (2023.01)

(58) Field of Classification Search
CPC .............................. H04L 5/0051; H04W 72/23
USPC ....................................................... 370/329
See application file for complete search history.

(56) References Cited

FOREIGN PATENT DOCUMENTS

WO 2018226411 A1 12/2018

OTHER PUBLICATIONS

Samsung, Uplink signal and channel design for NR-U, 3GPP TSG RAN WG1 #98, Aug. 26-30, 2019 (Year: 2019).*
International Search Report (ISR) dated Sep. 17, 2020 for Application No. PCT/IB2019/001457.
Written Opinion (WOSA) dated Dec. 23, 2019 for Application No. PCT/IB2019/001457.
Samsung:'Uplink signal and channel design for NR-U' 3GPP TSG RAN WG1 #98 R1-1908464 Aug. 16, 2019.
Ericsson: 'On aperiodic reference signals for NR-U' 3GPP TSG-RAN WG1 Meeting #97 R1-1907461 May 13, 2019.

* cited by examiner

*Primary Examiner* — Nicholas R Taylor
*Assistant Examiner* — Chong G Kim
(74) *Attorney, Agent, or Firm* — Ladas & Parry LLP

(57) ABSTRACT

The disclosure is related to a method, performed by a user equipment (UE), for Sounding Reference Signal (SRS) transmission, comprises the steps of:—receiving configuration of an SRS bundling function for enabling SRS bundling; —receiving an aperiodic SRS triggering indication in a determined DCI; —receiving resource allocation containing at least a determined transmission slot for a first uplink channel in the determined DCI; when the SRS is triggered, if the triggered SRS is enabled for SRS bundling by the SRS bundling function, transmitting the SRS in the same determined transmission slot as the first uplink channel.

20 Claims, 4 Drawing Sheets

```
SRS-ResourceSet ::=                          SEQUENCE {
    srs-ResourceSetId                        SRS-ResourceSetId,
    srs-ResourceIdList                       SEQUENCE (SIZE(1..maxNrofSRS-ResourcesPerSet)) OF
SRS-ResourceId   OPTIONAL,   -- Cond Setup resourceType                             CHOICE {
        aperiodic                            SEQUENCE {
        enable-SRS-bundling
            aperiodicSRS-ResourceTrigger     INTEGER (1..maxNrofSRS-TriggerStates-1),
            csi-RS                           NZP-CSI-RS-ResourceId
OPTIONAL,  -- Cond NonCodebook
            slotOffset                       INTEGER (1..32)
OPTIONAL,  -- Need S
            ...,
            [[
            aperiodicSRS-ResourceTriggerList-v1530   SEQUENCE (SIZE(1..maxNrofSRS-
TriggerStates-2))
                                                     OF INTEGER (1..maxNrofSRS-
TriggerStates-1)         OPTIONAL  -- Need M
            ]]
        },
```

```
SRS-ResourceSet ::=            SEQUENCE {
    srs-ResourceSetId          SRS-ResourceSetId,
    srs-ResourceIdList         SEQUENCE (SIZE(1..maxNrofSRS-ResourcesPerSet)) OF
SRS-ResourceId       OPTIONAL,    -- Cond Setup resourceType               CHOICE {
        aperiodic                  SEQUENCE {
        enable-SRS-bundling
            aperiodicSRS-ResourceTrigger   INTEGER (1..maxNrofSRS-TriggerStates-1),
            csi-RS                         NZP-CSI-RS-ResourceId
OPTIONAL,    -- Cond NonCodebook
            slotOffset                     INTEGER (1..32)
OPTIONAL,    -- Need S
            ...,
            [[
            aperiodicSRS-ResourceTriggerList-v1530  SEQUENCE (SIZE(1..maxNrofSRS-
TriggerStates-2))
                                                    OF INTEGER (1..maxNrofSRS-
TriggerStates-1)                           OPTIONAL    -- Need M
            ]]
        },
```

Figure 5

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet)) OF
SRS-ResourceId  OPTIONAL,    -- Cond Setup resourceType            CHOICE {
        aperiodic               SEQUENCE {
            aperiodicSRS-ResourceTrigger    INTEGER (1..maxNrofSRS-TriggerStates-1),
            csi-RS                          NZP-CSI-RS-ResourceId
OPTIONAL,   -- Cond NonCodebook
            slotOffset                      INTEGER (1..32,33)
OPTIONAL,   -- Need S
            ...,
            [[
            aperiodicSRS-ResourceTriggerList-v1530    SEQUENCE (SIZE(1..maxNrofSRS-
TriggerStates-2))                       OF INTEGER (1..maxNrofSRS-
TriggerStates-1)                        OPTIONAL    -- Need M
            ]]
        },
...
}
```

Figure 6

```
resourceMapping         SEQUENCE {
    startPosition           INTEGER (0..5),
    nrofSymbols             ENUMERATED {n1, n2, n4},
    repetitionFactor        ENUMERATED {n1, n2, n4},
},
```

Figure 7

METHOD FOR SRS BUNDLING IN NRU

CROSS-REFERENCE TO RELATED APPLICATIONS

This application is a continuation application of International Application No. PCT/IB2019/001457, filed on Dec. 23, 2019, the content of which is hereby incorporated by reference in its entirety.

TECHNICAL FIELD

The present disclosure relates to the field of communication technologies, and in particular, to a method for the UE to perform SRS bundling in NRU.

The communication technology is for example a 5G (fifth generation) network using the 5G NR (New Radio) as radio access technology (RAT) defined by 3GPP. The present disclosure is applicable to 5G NR-U (NR in unlicensed spectrum).

BACKGROUND

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a devices successfully occupies the channel, the transmission duration cannot exceed the Maximum Channel Occupancy Time (MCOT).

Aperiodic SRS Transmission

In Release 15 of the 3GPP standard, the aperiodic SRS is triggered by DCI (download control information) format 1_1 or format 0_1. However, the SRS location (i.e. slot index and symbol index) is pre-configured in RRC (radio resource control) configuration. Therefore, when a DCI that schedules an uplink transmission, e.g. PUSCH, and at the same time this DCI triggers SRS transmission. Often, these two transmissions happen in different slots.

Problem Statement

In the licensed spectrum, this might not be posing problem. However, in a shared spectrum as unlicensed band, if two uplink transmissions are conducted separately, e.g. DCI format 0_1 schedules an uplink data transmission (PUSCH) and triggers aperiodic SRS at the same time, the UE has to perform twice LBT, which will increase the LBT failure probability.

SUMMARY

A first object of the present disclosure is a method, performed by a user equipment (UE), for Sounding Reference Signal (SRS) transmission, comprising the steps of:

receiving configuration about SRS bundling function for enabling SRS bundling;

receiving an aperiodic SRS triggering indication in a determined DCI;

receiving resource allocation containing at least a determined transmission slot for a first uplink channel in the determined DCI;

when the SRS is triggered, if the triggered SRS is enabled for SRS bundling by the SRS bundling function, transmitting the SRS in the same determined transmission slot as the first uplink channel.

Such a method offers a more suitable way is that once the UE receives the triggered SRS, the UE will transmit SRS at the same time with the transmission of the PUSCH, these two uplink transmissions in the same determined transmission slot.

Advantageously, the first uplink channel is either an uplink control channel (PUCCH) or an uplink shared channel (PUSCH) and wherein the determined DCI is any of the following:

DCI format 1_1 assigning a downlink shared channel (PDSCH), scheduling an uplink control channel (PUCCH) and having aperiodic SRS triggering field; or DCI format 0_1 scheduling an uplink shared channel (PUSCH) and having aperiodic SRS triggering field.

Advantageously, the SRS transmission slot is the slot where the uplink control channel is scheduled by the determined DCI; or the slot where the uplink shared channel is scheduled by the determined DCI.

Advantageously, each slot contains a plurality of symbols and the first uplink channel occupies one or several symbols within the determined transmission slot, the method further comprising the steps of:

receiving at least one configured SRS symbol position and/or configured SRS duration corresponding to a number of symbols for transmitting the SRS;

transmitting the SRS symbols back-to-back with the first uplink channel symbols.

Moreover, when these two uplink transmissions happen back-to-back, i.e. one after the other without any gap in between, only one LBT needs to be performed to accomplish the these two uplink transmissions.

Advantageously, if at least one configured SRS symbol position is received, the at least one configured SRS symbol position is:

the first SRS position when the SRS is transmitted before the first uplink channel;

the last SRS position when the SRS is transmitted after the first uplink channel.

Advantageously, if a configured SRS duration is received the SRS is transmitted during the corresponding number of symbols:

before the first uplink channel; or after the first uplink channel.

Advantageously, if the number of available symbols before and after the first uplink channel is insufficient, the SRS transmission is split before and after the first uplink channel.

Advantageously, the SRS bundling function for enabling SRS bundling is enabled by RRC configuration.

Advantageously, the SRS bundling function is an explicit enabling parameter (enable_SRS_bundling) that is configured under SRS-Config IE; or under Aperiodic parameter of the SRS-ResourceSet IE.

Advantageously, the SRS bundling function is an implicit enabling parameter (slot offset value) that is configured by configuring a slot_offset value outside the range of usable slot_offset values.

Advantageously, the SRS slot and symbols are radio resource control (RRC) configured, the method further comprising the step of:
when the SRS bundling function is disabled, transmitting the SRS in the configured SRS slot and symbols.

A second aspect of the present disclosure is a method, performed by a base station (gNB), for Sounding Reference Signal (SRS) transmission, comprises the steps of:
configuring an SRS bundling function for enabling SRS bundling;
configuring an aperiodic SRS triggering indication in a determined DCI;
configuring resource allocation containing at least a determined transmission slot for a first uplink channel in the determined DCI;
when the SRS is triggered, if the triggered SRS is enabled for SRS bundling by the SRS bundling function, receiving the SRS in the same determined transmission slot as the first uplink channel.

Advantageously, the first uplink channel is either an uplink control channel (PUCCH) or an uplink shared channel (PUSCH) and wherein the determined DCI is any of the following:
DCI format 1_1 assigning a downlink shared channel (PDSCH), scheduling an uplink control channel (PUCCH) and having aperiodic SRS triggering field; or
DCI format 0_1 scheduling an uplink shared channel (PUSCH) and having aperiodic SRS triggering field.

Advantageously, the SRS transmission slot is the slot where the uplink control channel is scheduled by the determined DCI; or the slot where the uplink shared channel is scheduled by the determined DCI.

Advantageously, each slot contains a plurality of symbols and the first uplink channel occupies one or several symbols within the determined transmission slot, the method further comprising the steps of:
configuring at least one SRS symbol position and/or SRS duration corresponding to a number of symbols for transmitting the SRS;
receiving the SRS symbols back-to-back with the first uplink channel symbols.

Advantageously, if at least one SRS symbol position is configured, the at least one configured SRS symbol is:
the first SRS position when the SRS is received before the first uplink channel; or
the last SRS position when the SRS is received after the first uplink channel.

Advantageously, if a SRS duration is configured the SRS is received during the corresponding number of symbols before the first uplink channel; or after the first uplink channel.

Advantageously, if the number of available symbols before and after the first uplink channel is insufficient, the SRS reception is split before and after the first uplink channel.

Advantageously, the SRS bundling function for enabling SRS bundling is enabled by RRC configuration.

Advantageously, the SRS bundling function is an explicit enabling parameter (enable_SRS_bundling) that is configured under SRS-Config IE; or Aperiodic parameter in SRS-ResourceSet IE.

Advantageously, the SRS bundling function is an implicit enabling parameter (slot offset value) that is configured by configuring a slot_offset value outside the range of usable slot_offset values.

Advantageously, the SRS slot and symbols are radio resource control (RRC) configured, the method further comprising the step of:
when the SRS bundling function is disabled, receiving the SRS in the configured SRS slot and symbols.

A third aspect of the present disclosure is a user equipment (UE), operable for SRS transmission, comprising one or more processors configured to control the execution of the method defined in the first aspect.

A fourth aspect of the present disclosure is a computer readable medium comprising program instructions for causing a user equipment to perform the steps of the method according to the first aspect.

A fifth aspect of the present disclosure is a base station (gNB), operable for SRS reception, comprising one or more processors configured to control the execution of the method defined in the second aspect.

A sixth aspect of the present disclosure is a computer readable medium comprising program instructions for causing a base station to perform the steps of the method according to the second aspect.

BRIEF DESCRIPTION OF DRAWINGS

The appended drawings required in description of embodiments or the prior art will be briefly described below.

FIG. 1 shows a first example wherein the SRS transmission is not bundled with a first uplink channel;

FIG. 2 shows the first example wherein the SRS transmission is not bundled with a second uplink channel;

FIG. 3 shows a second example wherein the SRS transmission is bundled with the first uplink channel;

FIG. 4 shows the second example wherein the SRS transmission is bundled with the second uplink channel;

FIG. 5 is a sample code for a new type of SRS resource set configuration by introducing an enable-SRS-bundling parameter;

FIG. 6 is a sample code for setting a slot offset value as SRS bundling parameter;

FIG. 7 is a sample code for setting a resource Mapping parameter as SRS bundling parameter.

DESCRIPTION OF EMBODIMENTS

In a shared spectrum as unlicensed band, if two uplink transmissions are conducted separately, e.g. DCI format 0_1 schedules an uplink data transmission (PUSCH) and triggers aperiodic SRS at the same time, the UE has to perform two times LBT, which will increase the LBT failure probability. A more suitable way is that once the gNB triggers the SRS at the same time with the trigger of the PUSCH, these two uplink transmissions can happen in the same slot. Moreover, these two transmissions should preferably happen back-to-back, i.e. one after the other without any gap in between, so that only one LBT needs to be performed to accomplish the transmission of these two. In this disclosure, we present some solutions to realize this enhancement.

In the following non-limiting examples, the method of SRS transmission will be presented from the user equipment side and is of course also applicable to the base station side.

Example 1

Figures 1, 2:
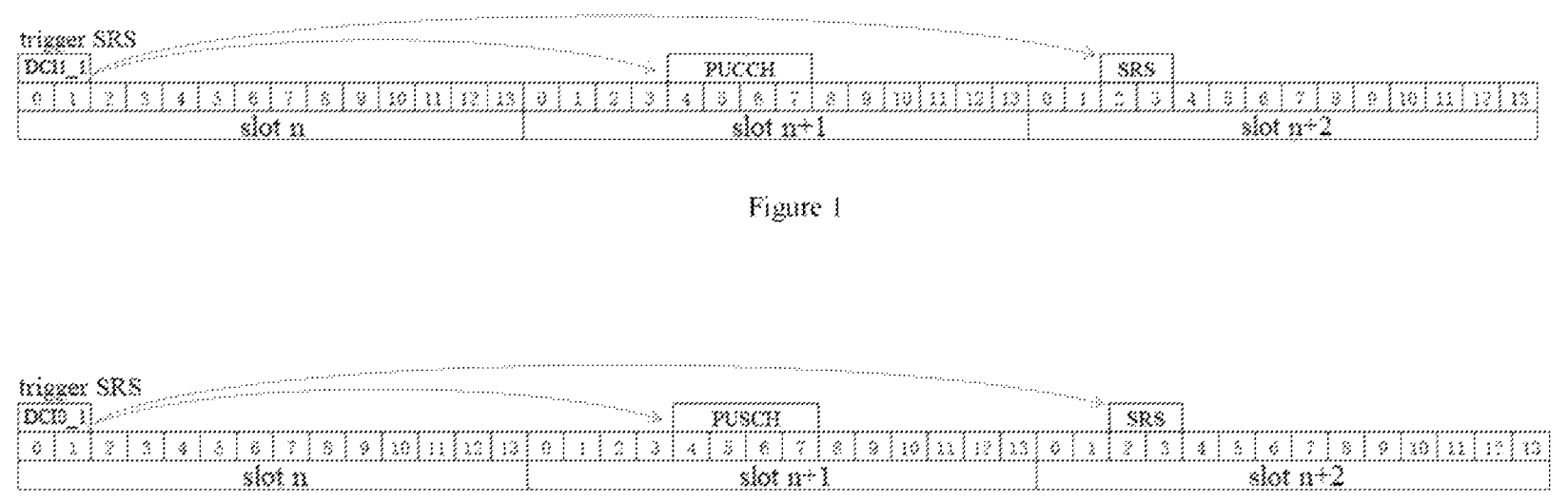

In this first example, SRS is not bundled with the other uplink transmissions. In FIG. 1, the DCI format 1_1 assignes a PDSCH transmission and schedules a PUCCH resource for the UE to report the Ack/Nack feedback, at the same time in this DCI, the network triggers an aperiodic SRS resource set.

When SRS bundling function is not enabled, the SRS slot location follows the configured slot offset in SRS resource set configuration and the SRS symbol location follows the SRS resource configuration under the triggered SRS resource set.

In this example, we assume that for the SRS resource set configuration, it configures the slot offset is 2, meaning that the SRS is transmitted in the slot n+2 if the triggering DCI is received in slot n. The PUCCH is assumed to be scheduled in slot n+1.

Similarly, as shown in FIG. 2, if a DCI format 0_1 schedules a PUSCH transmission, the aperiodic SRS can also be triggered in the same DCI. When SRS bundling function is not enabled, the SRS slot location follows the configured slot offset in SRS resource set configuration and the SRS symbol location follows the SRS resource configuration under the triggered SRS resource set. In this example, we assume that for the SRS resource set configuration, it configures the slot offset is 2, meaning that the SRS is transmitted in the slot n+2 if the triggering DCI is received in slot n. The PUCCH is assumed to be scheduled in slot n+1.

Example 2

Figures 3, 4:
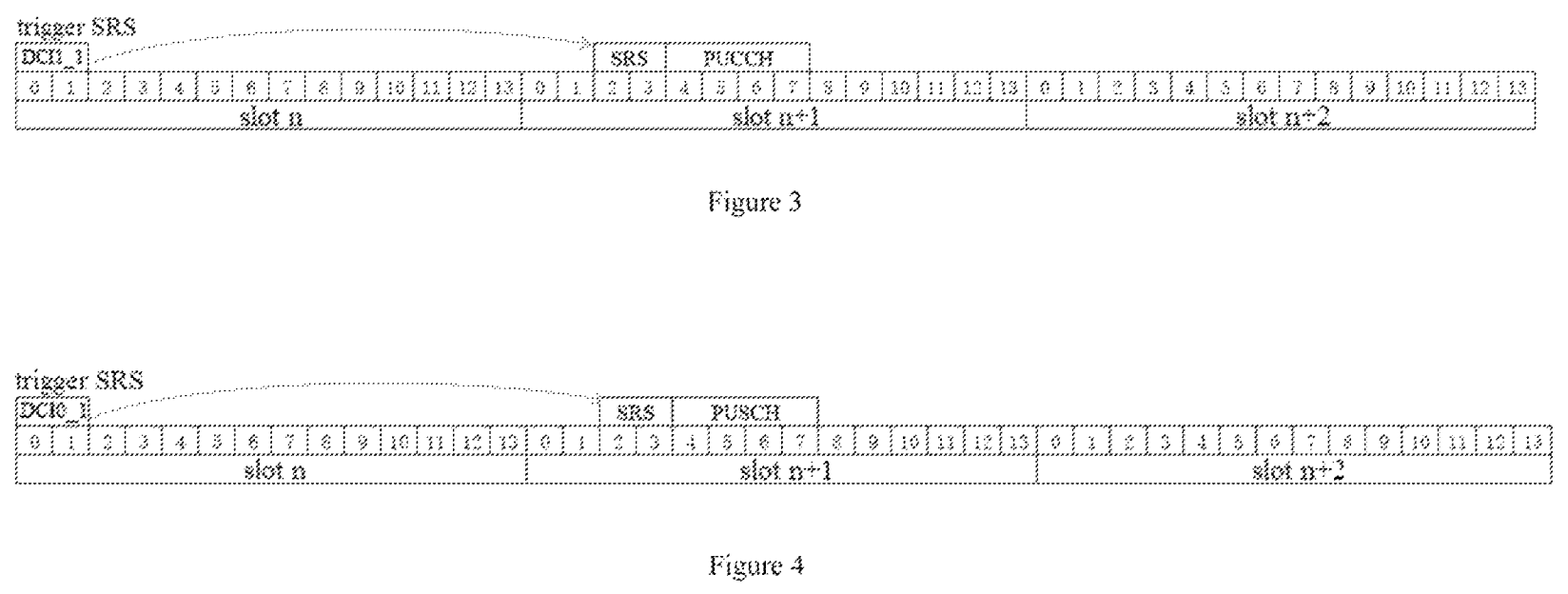

SRS is bundled with another uplink transmissions. When the SRS bundling function is enabled, the SRS slot location is no longer following the SRS resource set configuration, but instead, the SRS slot location follows the scheduled PUCCH if an SRS is triggered by DCI format 1_1; or follows the scheduled PUSCH if an SRS is triggered by DCI format 0_1, as shown in FIGS. 3 and 4.

With the SRS bundling, the triggered SRS and scheduled PUSCH or PUCCH are always in the same slot. More specifically speaking, when the SRS bundling function is enabled, for DCI format 1_1 scheduling PUCCH and triggering aperiodic SRS at the same time, the SRS slot should follow PUCCH slot indication (i.e. indicated by PDSCH-to-HARQ_feedback timing indicator). For DCI format 0_1 scheduling PUSCH and triggering aperiodic SRS at the same time, the SRS slot should follow PUSCH slot indication, i.e. indicated by K2 in time domain resource assignment).

Example 3: SRS Bundling Function Configuration

In this example, we discuss how to enable the SRS bundling function. An easy solution is to introduce a RRC parameter under SRS-config 1E. This parameter can be enable-SRS-bundling. When this parameter is configured, the aperiodic SRS is bundled with the other scheduled uplink channel, i.e. PUSCH or PUCCH, as shown in example 2. Although this solution is very simple, the restriction is that as long as SRS bundling is configured, the aperiodic SRS has to be bundled with other scheduled uplink transmission all the time. This might not render full flexibility to the system.

To improve the flexibility we can introduce a new type of SRS resource set configuration by introduce enable-SKS-bundling parameter, for instance under the resourceType, and aperiodic in SRS-ResourceSet IE, such as shown in FIG. 5.

With this solution, the network can configure multiple SRS resource sets, only those SRS resource sets that are configured with enable-SRS-bundling are bundled with other scheduled uplink transmission (PUCCH or PUSCH). Therefore, the network can have flexibility to select when to bundle the SRS.

Alternatively, an additional offset candidate value can be introduced in the slotOffset under SRS-ResourceSet IE. In Rel-15, the slotOffset contains candidate values {1, . . . , 32}.

As shown in FIG. 6, we can introduce a special value, e.g. non-numerical value, or any other numerical value than 1~32. In this case, if the SRS resource set is configured with this special slot offset value, this SRS resource set is bundled with PUCCH or PUSCH, e.g. in our example, we introduce an additional value 33, and whenever the slotOffset is configured with value 33, it is considered as a special SRS resource set with bundling function enabled. Of course, this additional value is not limited to 33 and can be other choices.

Example 4: SRS Symbol Location Configuration

In the above examples, we introduce the SRS bundling with scheduled PUCCH or PUSCH in the same slot. In this example, we further discuss how to configure the SRS symbol locations. In Rel.15, the SRS symbol locations are configured in each SRS resource configuration (SRS-Resource IE). In this IE, there is a resourceMapping parameter in which the network can configure the starting position of SRS (startPosition) and the duration of SRS in symbol level (nrofSymbols). In fact, for NRU system, the motivation of bundling SRS with scheduled PUCCH or PUSCH is to have two transmissions happen in a back-to-back manner without any gap in between (as shown in FIG. 3 and FIG. 4).

Therefore the starting position of the SRS might not be suitable for bundling with PUSCH. The reason is that the starting position is semi-statically configured but the scheduled PUSCH is dynamically scheduled. One solution is that under resourceMapping parameter in SRS-Resource IE, the startPosition is not configured, and only nrofSymbols is configured, then the UE will understand that the starting SRS position is bundled with scheduled PUCCH or PUSCH, for instance X symbols prior to the first symbol of PUCCH or PUSCH, where X is given by nrofSymbols.

This is equivalent to append the SRS in front of PUCCH/PUSCH. Alternatively, the SRS can also be appended right after PUCCH/PUSCH, either ways, only nrofSymbols configuration is needed. In order to flexibly control whether the SRS should be appended prior to or after PUCCH/PUSCH. A 1-bit control information can be introduced to DCI format 1_1 and/or DCI format 0_1 for dynamic selection. Or this can be introduced in resourceMapping parameter, e.g. a special value for startPosition, such as value 14=appended prior to and 15=appended after, as shown in FIG. 7.

LIST OF ABBREVIATIONS IN THE DESCRIPTION AND DRAWINGS

| Acronyms | Full name |
| --- | --- |
| LTE | Long Term Evolution |
| LTE-A | Advanced long term evolution |
| NR | New Radio |
| NR-U | New Radio-unlicensed spectrum |
| BS/gNB | Base Station/gNode B |
| UE | User Equipment |
| COT | Channel Occupancy Time |
| PUSCH | Physical uplink shared channel |
| PUCCH | Physical uplink control channel |
| PDSCH | Physical downlink shared channel |

| Acronyms | Full name |
| --- | --- |
| DCI | Download control information |
| LBT | Listen Before Talk |
| MCOT | Maximum Channel Occupancy Time |
| CG | Common Group |
| SRS | Sounding Reference Signal |
| RAT | Radio Access Technology |
| OFDM | Orthogonal Frequency Division Multiplex(ing) |

In the above description, the mobile telecommunication system is a 5G mobile network comprising a 5G NR access network. The present example embodiment is applicable to NR in unlicensed spectrum (NR-U). The present disclosure can be applied to other mobile networks, in particular to mobile network of any further generation cellular network technology (6G, etc.).

The above is only a specific implementation manner of the present disclosure, the protection scope of the present disclosure is not limited thereto, and changes or substitutions that can easily be thought of by those skilled in the art within the technical scope disclosed in the present disclosure should be covered by the protection scope of the present disclosure. Therefore, the protection scope of the present disclosure should be subject to the protection scope of the claims.

The various embodiments/examples, aspects and features, if any, described in this specification that do not fall under the scope of the independent claims are to be interpreted as examples useful for understanding various embodiments of the disclosure.

What is claimed is:

1. A method, performed by a user equipment (UE), for sounding reference signal (SRS) transmission, comprises the steps of:
   receiving configuration of an SRS bundling function for enabling SRS bundling;
   receiving an aperiodic SRS triggering indication in a determined download control information (DCI);
   receiving resource allocation containing at least a determined transmission slot for a first uplink channel in the determined DCI;
   when the SRS is triggered, if the triggered SRS is enabled for SRS bundling by the SRS bundling function, transmitting the SRS in the same determined transmission slot as the first uplink channel;
   wherein the SRS bundling function for enabling SRS bundling is enabled by radio resource control (RRC) configuration; and wherein,
   the SRS bundling function is an explicit enabling parameter that is configured under Aperiodic parameter of an SRS-ResourceSet information element (IE) or SRS-Config information element (IE); or
   the SRS bundling function is an implicit enabling parameter that is configured by configuring a slot_offset value outside a range of usable slot_offset values.

2. The method according to claim 1, wherein the first uplink channel is either an uplink control channel or an uplink shared channel, and wherein the determined DCI is any of the following:
   DCI format 1_1 assigning a downlink shared channel, scheduling an uplink control channel and having aperiodic SRS triggering field; or
   DCI format 0_1 scheduling an uplink shared channel and having aperiodic SRS triggering field.

3. The method according to claim 2, wherein the SRS transmission slot is
   the slot where the uplink control channel is scheduled by the determined DCI; or
   the slot where the uplink shared channel is scheduled by the determined DCI.

4. The method according to claim 1, wherein each slot contains a plurality of symbols and the first uplink channel occupies one or several symbols within the determined transmission slot, the method further comprising the steps of:
   receiving at least one of at least one configured SRS symbol position and configured SRS duration corresponding to a number of symbols for transmitting the SRS;
   transmitting the SRS symbols back-to-back with the first uplink channel symbols.

5. The method according to claim 4, wherein if at least one configured SRS symbol position is received, the at least one configured SRS symbol position is:
   the first SRS position when the SRS is transmitted before the first uplink channel;
   the last SRS position when the SRS is transmitted after the first uplink channel; or
   wherein if a configured SRS duration is received, the SRS is transmitted during the corresponding number of symbols:
   before the first uplink channel; or
   after the first uplink channel.

6. The method according to claim 5, wherein if the number of available symbols before and after the first uplink channel is insufficient, the SRS transmission is split before and after the first uplink channel.

7. The method according to claim 1, wherein the RRC configuration further configures SRS slot and symbols; wherein the method further comprises the step of:
   when the SRS bundling function is disabled, transmitting the SRS in the configured SRS slot and symbols.

8. A method, performed by a base station, for sounding reference signal (SRS) transmission, comprises the steps of:
   configuring an SRS bundling function for enabling SRS bundling;
   transmitting an aperiodic SRS triggering indication in a determined download control information (DCI);
   transmitting resource allocation containing at least a determined transmission slot for a first uplink channel in the determined DCI;
   when the SRS is triggered, if the triggered SRS is enabled for SRS bundling by the SRS bundling function, receiving the SRS in the same determined transmission slot as the first uplink channel;
   wherein the SRS bundling function for enabling SRS bundling is enabled by radio resource control (RRC) configuration; and wherein,
   the SRS bundling function is an explicit enabling parameter that is configured under Aperiodic parameter of an SRS-ResourceSet information element (IE) or SRS-Config information element (IE): or
   the SRS bundling function is an implicit enabling parameter that is configured by configuring a slot_offset value outside a range of usable slot_offset values.

9. The method according to claim 8, wherein the first uplink channel is either an uplink control channel or an uplink shared channel, and wherein the determined DCI is any of the following:

DCI format 1_1 assigning a downlink shared channel, scheduling an uplink control channel and having aperiodic SRS triggering field; or DCI format 0_1 scheduling an uplink shared channel and having aperiodic SRS triggering field.

10. The method according to claim 9, wherein the SRS transmission slot is
the slot where the uplink control channel is scheduled by the determined DCI; or
the slot where the uplink shared channel is scheduled by the determined DCI.

11. The method according to claim 8, wherein each slot contains a plurality of symbols and the first uplink channel occupies one or several symbols within the determined transmission slot, the method further comprising the steps of:
configuring at least one of at least one SRS symbol position and SRS duration corresponding to a number of symbols for transmitting the SRS;
receiving the SRS symbols back-to-back with the first uplink channel symbols.

12. The method according to claim 11, wherein if at least one SRS symbol position is configured, the at least one configured SRS symbol position is:
the first SRS position when the SRS is received before the first uplink channel;
the last SRS position when the SRS is received after the first uplink channel; or
wherein if a SRS duration is configured, the SRS is received during the corresponding number of symbols:
before the first uplink channel; or
after the first uplink channel.

13. The method according to claim 12, wherein if the number of available symbols before and after the first uplink channel is insufficient, the SRS reception is split before and after the first uplink channel.

14. The method according to claim 8, wherein the RRC configuration further configures SRS slot and symbols; wherein the method further comprises the step of:
when the SRS bundling function is disabled, receiving the SRS in the configured SRS slot and symbols.

15. A user equipment (UE), operable for SRS transmission, comprising a processor, a memory, and a transceiver, wherein the memory is configured to store a computer program, and the processor is configured to call and run the computer program stored in the memory to control the transceiver to;
receive configuration of an SRS bundling function for enabling SRS bundling;
receive an aperiodic SRS triggering indication in a determined download control information (DCI);
receive resource allocation containing at least a determined transmission slot for a first uplink channel in the determined DCI;

when the SRS is triggered, if the triggered SRS is enabled for SRS bundling by the SRS bundling function, transmit the SRS in the same determined transmission slot as the first uplink channel;
wherein the SRS bundling function for enabling SRS bundling is enabled by radio resource control (RRC) configuration; and wherein
the SRS bundling function is an explicit enabling parameter that is configured under Aperiodic parameter of an SRS-ResourceSet information element (IE) or SRS-Config information element (IE); or
the SRS bundling function is an implicit enabling parameter that is configured by configuring a slot_offset value outside a range of usable slot_offset values.

16. The UE according to claim 15, wherein the first uplink channel is either an uplink control channel or an uplink shared channel, and wherein the determined DCI is any of the following:
DCI format 1_1 assigning a downlink shared channel, scheduling an uplink control channel and having aperiodic SRS triggering field; or
DCI format 0_1 scheduling an uplink shared channel and having aperiodic SRS triggering field.

17. The UE according to claim 16, wherein the SRS transmission slot is
the slot where the uplink control channel is scheduled by the determined DCI; or
the slot where the uplink shared channel is scheduled by the determined DCI.

18. The UE according to claim 15, wherein each slot contains a plurality of symbols and the first uplink channel occupies one or several symbols within the determined transmission slot, and the processor is further configured to call and run the computer program stored in the memory to control the transceiver to:
receive at least one of at least one configured SRS symbol position and configured SRS duration corresponding to a number of symbols for transmitting the SRS;
transmit the SRS symbols back-to-back with the first uplink channel symbols.

19. The UE according to claim 18, wherein if at least one configured SRS symbol position is received, the at least one configured SRS symbol position is:
the first SRS position when the SRS is transmitted before the first uplink channel;
the last SRS position when the SRS is transmitted after the first uplink channel; or
wherein if a configured SRS duration is received, the SRS is transmitted during the corresponding number of symbols:
before the first uplink channel; or
after the first uplink channel.

20. The UE according to claim 19, wherein if the number of available symbols before and after the first uplink channel is insufficient, the SRS transmission is split before and after the first uplink channel.

* * * * *